United States Patent
Matsuzawa

(10) Patent No.: US 10,351,445 B2
(45) Date of Patent: Jul. 16, 2019

(54) ELECTROLYTIC ION WATER GENERATION METHOD AND ELECTROLYTIC ION WATER GENERATION APPARATUS

(71) Applicant: KABUSHIKI KAISHA E-PLAN, Funabashi-shi, Chiba (JP)

(72) Inventor: Tamio Matsuzawa, Funabashi (JP)

(73) Assignee: KABUSHIKI KAISHA E-PLAN, Chiba (JP)

( * ) Notice: Subject to any disclaimer, the term of this patent is extended or adjusted under 35 U.S.C. 154(b) by 142 days.

(21) Appl. No.: 15/500,464

(22) PCT Filed: Jul. 29, 2014

(86) PCT No.: PCT/JP2014/069980
§ 371 (c)(1),
(2) Date: Jan. 30, 2017

(87) PCT Pub. No.: WO2016/016954
PCT Pub. Date: Feb. 4, 2016

(65) Prior Publication Data
US 2017/0247267 A1    Aug. 31, 2017

(51) Int. Cl.
*C25B 15/08* (2006.01)
*C25B 9/00* (2006.01)
(Continued)

(52) U.S. Cl.
CPC ............ *C02F 1/4618* (2013.01); *C02F 1/001* (2013.01); *C02F 2001/4619* (2013.01); *C02F 2001/46138* (2013.01); *C02F 2201/4612* (2013.01); *C02F 2201/4617* (2013.01); *C02F 2201/46105* (2013.01); *C02F 2201/46115* (2013.01); *C02F 2209/06* (2013.01); *C02F 2209/42* (2013.01)

(58) Field of Classification Search
CPC .. C25B 15/08; C25B 9/00; C25B 1/04; C25B 15/00; C25D 17/00
USPC ......................................................... 204/237
See application file for complete search history.

(56) References Cited

FOREIGN PATENT DOCUMENTS

JP    2001-54790 A    2/2001
JP    2006-15303 A    1/2006
(Continued)

OTHER PUBLICATIONS

Sep. 22, 2014 Written Opinion issued in International Patent Application No. PCT/JP2014/069980.
(Continued)

*Primary Examiner* — Zulmariam Mendez
(74) *Attorney, Agent, or Firm* — Oliff PLC

(57) ABSTRACT

An electrolytic ion water generation method for generating strong electrolytic ion water having a pH value higher than a reference pH value through use of the same generation apparatus as an electrolytic ion water generation apparatus configured to generate electrolytic ion water having the reference pH value by setting an amount of raw water, which is to be supplied into a cathode chamber of an electrolytic bath, to be smaller than that of the raw water used for generating the electrolytic ion water having the reference pH value and setting generation conditions other than the amount of the raw water to the same generation conditions as those for generating the electrolytic ion water having the reference pH value. The raw water amount is set to a raw water amount calculated based on the following expression: $pH=14+\log[OH^-]$.

2 Claims, 3 Drawing Sheets

(51) Int. Cl.
*C25B 1/04* (2006.01)
*C25B 15/00* (2006.01)
*C02F 1/461* (2006.01)
*C02F 1/00* (2006.01)

(56) References Cited

FOREIGN PATENT DOCUMENTS

| | | |
|---|---|---|
| JP | 3122342 U | 6/2006 |
| JP | 2012-67336 A | 4/2012 |
| JP | 4967050 B2 | 7/2012 |
| JP | 3177645 U | 8/2012 |

OTHER PUBLICATIONS

Sep. 22, 2014 Search Report issued in International Patent Application No. PCT/JP2014/069980.

ELECTROLYTIC ION WATER GENERATION METHOD AND ELECTROLYTIC ION WATER GENERATION APPARATUS

BACKGROUND OF THE INVENTION

1. Field of the Invention

The present invention relates to an electrolytic ion water generation method and an electrolytic ion water generation apparatus, which are suitable for generating electrolytic ion water such as alkaline ion water and alkaline electrolyzed water, in particular, electrolytic ion water having a pH value of 13 or more, which is generally called strong alkaline ion water.

2. Description of the Related Art

Electrolytic ion water is excellent in cleaning effect, and is drawing attention as cleaning water or drinking water that does not have adverse effects on the global environment even when being discharged. In particular, strong alkaline water having a high pH value is regarded as being excellent in detergency.

As an electrolytic ion water generation apparatus, there have been known an apparatus in which an ion exchange membrane, a spacer, an anode plate, and a cathode plate are removably mounted on an electrolytic solution tank as cartridge type components (Patent Literature 1), and an apparatus capable of generating strong alkaline water by variably controlling the circulation time of cathode water and anode water or the total amount of a DC current (Patent Literature 2).

CITATION LIST

Patent Literature

[PTL 1]: JP 4967050 B
[PTL 2]: JP 3177645 U

Electrolytic ion water is used in various industry segments such as the cleaning industry, food and drink industry, and industrial waste management industry. The required pH value of electrolytic ion water varies depending on the industry in which the electrolytic ion water is used, and hence there is a demand for a method and an apparatus capable of generating electrolytic ion water having different pH values. In Japanese Utility Model Registration No. 3177645, strong alkaline water can be generated by variably controlling the circulation time of cathode water and anode water or the total amount of a DC current during generation of electrolytic ion water.

SUMMARY OF THE INVENTION

It is an object of the present invention to provide a method and apparatus for generating electrolytic ion water having a high pH value (high alkali concentration) through use of the same electrolytic ion water generation apparatus (one electrolytic ion water generation apparatus).

[Principle of Electrolytic Ion Water Generation Method]

An electrolytic ion water generation method of the present invention is a method of generating, through use of an apparatus configured to generate electrolytic ion water having a pH value to be a reference (hereinafter referred to as "reference pH value"), electrolytic ion water having a pH value higher than the reference pH value, and the method is capable of generating electrolytic ion water having a high pH value by reducing a storage amount or supply amount of raw water without changing other ion water generation conditions, for example, the circulation time of cathode water and anode water or a DC current, from conditions for generating ion water having the reference pH value (including the case in which the other ion water generation conditions are hardly changed; the same also applies to the detailed description of the invention and the appended claims).

[Electrolytic Ion Water Generation Method 1]

An electrolytic ion water generation method according to one embodiment of the present invention is a storage type electrolytic ion water generation method for generating electrolytic ion water having a pH value higher than a reference pH value through use of a storage type electrolytic ion water generation apparatus capable of storing raw water into a raw water tank and generating electrolytic ion water having the reference pH value (in the present invention, the reference pH value refers to pH 12.5). The method includes: storing, into the raw water tank of the storage type electrolytic ion water generation apparatus, the raw water in an amount smaller than an amount of the raw water used for generating the electrolytic ion water having the reference pH value, and setting generation conditions other than the amount of the raw water to the same generation conditions as conditions for generating the electrolytic ion water having the reference pH value with the storage type electrolytic ion water generation apparatus; circulating the raw water stored in the raw water tank by sending the raw water to a cathode chamber partitioned by a cation exchange membrane of an electrolytic bath and returning the raw water from the cathode chamber to the raw water tank, circulating an electrolytic solution stored in an electrolytic solution tank of the storage type electrolytic ion water generation apparatus to an anode chamber of the electrolytic bath, applying a voltage to a cathode plate of the cathode chamber of the electrolytic bath and to an anode plate of the anode chamber of the electrolytic bath, to thereby subject the electrolytic solution to electrolysis, and reducing a cation generated by the electrolysis with the raw water circulated in the cathode chamber, to thereby generate the electrolytic ion water from the raw water; and repeating the circulation of the raw water and the circulation of the electrolytic solution until the raw water in the raw water tank reaches a predetermined pH value, to thereby generate the electrolytic ion water having the predetermined pH value from the raw water stored in the raw water tank.

[Electrolytic Ion Water Generation Method 2]

An electrolytic ion water generation method according to another embodiment of the present invention is a flow type electrolytic ion water generation method for generating electrolytic ion water having a pH value higher than a reference pH value through use of a flow type electrolytic ion water generation apparatus configured to generate electrolytic ion water having the reference pH value while supplying raw water into a raw water tank to continuously generate the electrolytic ion water while discharging the generated electrolytic ion water from the raw water tank. The method includes: supplying, into the raw water tank of the flow type electrolytic ion water generation apparatus, the raw water in an amount smaller than an amount of the raw water used for generating the electrolytic ion water having the reference pH value, and setting generation conditions other than the amount of the raw water to the same generation conditions as conditions for generating the electrolytic ion water having the reference pH value with the flow type electrolytic ion water generation apparatus; and circulating the raw water supplied into the raw water tank by sending the raw water to a cathode chamber partitioned by a cation exchange membrane of an electrolytic bath and returning the raw water from the cathode chamber to the raw water tank, circulating an electrolytic solution stored in an electrolytic solution tank of the flow type electrolytic ion water generation apparatus to an anode chamber partitioned by the cation exchange membrane, applying a voltage to a cathode plate of the cathode chamber of the electrolytic bath and to an anode plate of the anode chamber of the electrolytic bath, to thereby subject the electrolytic solution to electrolysis, reducing a cation generated by the electrolysis with the raw water circulated in the cathode chamber, to thereby generate the electrolytic ion water from the raw water, and generating the electrolytic ion water having a predetermined pH value while discharging the electrolytic ion water having reached the predetermined pH value in the raw water tank from the raw water tank by a raw water supply amount to the raw water tank.

In both the storage type and flow type electrolytic ion water generation methods according to the embodiments of the present invention, the relationship between the storage amount or supply amount of the raw water for generating the electrolytic ion water having the reference pH value (hereinafter referred to as "reference raw water amount") and the storage amount or supply amount of the raw water required for generating the strong alkaline ion water having a pH value higher than the reference pH value (hereinafter referred to as "small raw water amount") can be determined based on the following expression. This expression is an expression for determining an alkali concentration based on pH, and respective numerical values of [OH$^-$] (mol/L), KOH concentration (%), an alkali concentration ratio, and a storage amount or supply amount of raw water into the raw water tank, which are determined based on the expression, are as shown in Table 1.

$$pH = 14 + \log[OH^-]$$

When the reference pH is 12.5, the following result is obtained from the expression:

$$12.5 = 14 + \log[OH^-]$$
$$[OH^-] = 10^{12.5-14}$$
$$= 0.0316 \text{ mol/L}$$

A KOH molecular weight is 56.1 g/mol, and hence $$KOH\ concentration = 0.0316\ mol/L \times 56.1\ g/mol$$
$$= 1.772\ g/L$$
$$= 0.1772\%$$

Similarly, those values were determined also in the case of pH 13.0 and pH 13.1.

When pH is 13.0, the following result is obtained from the expression:

$$13.0 = 14 + \log[OH^-]$$
$$[OH^-] = 10^{13.0-14}$$
$$= 0.1000\ mol/L$$

A KOH molecular weight is 56.1 g/mol, and hence $$KOH\ concentration = 0.1000\ mol/L \times 56.1\ g/mol$$
$$= 5.610\ g/L$$
$$= 0.5610\%$$

When pH is 13.1, the following result is obtained from the expression:

$$13.1 = 14 + \log[OH^-]$$
$$[OH^-] = 10^{13.1-14}$$
$$= 0.1259\ mol/L$$

A KOH molecular weight is 56.1 g/mol, and hence $$KOH\ concentration = 0.1259\ mol/L \times 56.1\ g/mol$$
$$= 7.063\ g/L$$
$$= 0.7063\%$$

When the alkali concentration ratio at pH 12.5 is assumed to be 1, the alkali concentration ratio at pH 13.0 is 0.1000/0.0316=3.16453.16 based on [OH$^-$]=0.1000 mol/L at pH 13.0 and [OH$^-$]=0.0316 mol/L at pH 12.5 (Table 1).

Similarly to the foregoing, the alkali concentration ratio at pH 13.1 is 0.1259/0.0316=3.9841≈3.98 based on [OH$^-$]=0.1259 mol at pH 13.1 and [OH$^-$]=0.0316 mol/L at pH 12.5 (Table 1).

It is assumed that the alkali concentration ratio at pH 12.5 is 1, and the amount of raw water to be stored or supplied into a raw water tank 1 is 20 L. In this case, the alkali concentration ratio at pH 13.0 is 3.16, and hence the amount of raw water to be stored or supplied into the raw water tank 1 is 20/3.16=6.3291≈6.3 L (Table 1).

Similarly to the foregoing, the alkali concentration ratio at pH 13.1 is 3.98, and hence the amount of raw water to be stored or supplied into the raw water tank 1 is 20/3.98=5.02515.0 L (Table 1).

TABLE 1

| pH value | [OH$^-$] (mol/L) | KOH concentration (%) | Alkali concentration ratio | Amount of raw water to be stored (supplied) into raw water tank (L) |
|---|---|---|---|---|
| pH 12.5 | 0.0316 | 0.1772 | 1 | 20.0 |
| pH 13.0 | 0.1000 | 0.5610 | 3.16 | 6.3 |
| pH 13.1 | 0.1259 | 0.7063 | 3.98 | 5.0 |

As shown in Table 1, it is understood that, when the reference raw water amount for generating electrolytic ion water having a reference pH value of 12.5 is 20 liters (L), it is appropriate that the small raw water amount for generating electrolytic ion water having a pH value of 13.0 be 6.3 L, and the small raw water amount for generating electrolytic ion water having a pH value of 13.1 be 5 L.

[Electrolytic Ion Water Generation Apparatus 1]

An electrolytic ion water generation apparatus according to one embodiment of the present invention is a storage type electrolytic ion water generation apparatus, which is capable of generating electrolytic ion water having a reference pH value while storing raw water into a raw water tank and circulating the stored raw water by supplying the stored raw water into an electrolytic bath and returning the raw water to the raw water tank. The storage type electrolytic ion water generation apparatus includes: the raw water tank configured to store the raw water; an electrolytic solution tank configured to store an electrolytic solution; the electrolytic bath including a cathode chamber and an anode chamber partitioned by a cation exchange membrane; a cathode plate arranged in the cathode chamber and an anode plate arranged in the anode chamber; a power source configured to apply a voltage to the cathode plate and the anode plate; a raw water circulation pump configured to send the raw water stored in the raw water tank to the cathode chamber and return the raw water to the raw water tank; an electrolytic solution circulation pump configured to send the electrolytic solution stored in the electrolytic solution tank to the anode chamber and return the electrolytic solution to the electrolytic solution tank; and raw water amount control means capable of controlling a raw water amount to be stored into the raw water tank. The raw water amount control means is capable of detecting the raw water amount in the raw water tank, and the raw water amount in the raw water tank to be detected is determined based on the following expression with respect to an amount required for generating electrolytic ion water having the reference pH value:

$$pH=14+\log[OH^-].$$

The raw water amount control means is capable of detecting that the raw water amount calculated by the expression has been stored into the raw water tank, to thereby cause the supply of the raw water into the raw water tank to be automatically stopped.

The raw water amount control means includes float switches, and the float switches are arranged in at least two portions including a lower stage and an upper stage in the raw water tank. The float switch in the upper stage is set to a water level at a time when the electrolytic ion water having the reference pH value is generated, and the float switch in the lower stage is set to a water level at a time when the electrolytic ion water having a generation desired pH value is generated. When the electrolytic ion water having the reference pH value is generated, the float switch in the lower stage is set to a non-operation state in which the float switch in the lower stage is prevented from being operated even when the raw water has reached the float switch in the lower stage so that only the float switch in the upper stage is operated, and when the raw water stored in the raw water tank has reached the float switch in the upper stage, the supply of the raw water into the raw water tank is automatically stopped. When the electrolytic ion water having the generation desired pH value is generated, the float switch in the lower stage is set such that the float switch in the lower stage is operated when the raw water has reached the float switch in the lower stage, and when the raw water stored in the raw water tank has reached the float switch in the lower stage, the supply of the raw water into the raw water tank is automatically stopped.

[Electrolytic Ion Water Generation Apparatus 2]

An electrolytic ion water generation apparatus according to another embodiment of the present invention is a flow type electrolytic ion water generation apparatus, which is capable of generating electrolytic ion water having a reference pH value while supplying raw water into a raw water tank. The flow type electrolytic ion water generation apparatus includes: the raw water tank configured to be supplied with the raw water; an electrolytic solution tank configured to store an electrolytic solution; an electrolytic bath including a cathode chamber and an anode chamber partitioned by a cation exchange membrane; a cathode plate arranged in the cathode chamber and an anode plate arranged in the anode chamber; a power source configured to apply a voltage to the cathode plate and the anode plate; a raw water circulation pump configured to send the raw water supplied into the raw water tank to the cathode chamber and return the raw water to the raw water tank; an electrolytic solution circulation pump configured to send the electrolytic solution stored in the electrolytic solution tank to the anode chamber and return the electrolytic solution to the electrolytic solution tank; an outlet port configured to discharge the electrolytic ion water from the raw water tank during the generation of the electrolytic ion water; and raw water amount control means capable of controlling a raw water amount to be supplied into the raw water tank. The raw water amount control means is a raw water supply path, and in the raw water supply path, a raw water supply amount (per hour) determined based on the above-mentioned expression is set with respect to a raw water supply amount per hour for supplying the raw water into the raw water tank when the electrolytic ion water having the reference pH value is generated. The flow type electrolytic ion water generation apparatus is capable of generating the electrolytic ion water, while supplying the raw water in the raw water supply amount determined based on the above-mentioned expression into the raw water tank and discharging the generated electrolytic ion water from the raw water tank.

The electrolytic ion water generation apparatus includes two or more raw water supply paths. At least one of the raw water supply paths has a raw water supply amount per unit time enabling supply of the raw water in an amount required for generating the electrolytic ion water having the reference pH value, and another of the raw water supply paths has a raw water supply amount per unit time determined based on the above-mentioned expression with respect to a raw water supply amount required for generating the electrolytic ion water having the reference pH value.

The electrolytic ion water generation method according to the embodiments of the present invention has the following effects.

(1) Electrolytic ion water (strong electrolytic ion water) having a high pH value can be generated through use of the same electrolytic ion water generation apparatus by setting the amount of the raw water to be stored or supplied into the raw water tank to be smaller than that of the raw water used for generating the electrolytic ion water having the reference pH value without changing the other generation conditions. Therefore, it is not necessary to prepare various electrolytic ion water generation apparatus having different generation conditions depending on the pH value of electrolytic ion water to be generated. As a result, cost for introducing apparatus can be reduced. Further, it is not necessary to prepare a large setting space, and hence running cost can also be reduced.

(2) Weak electrolytic ion water having a pH value equal to or less than the reference pH value can be mass-produced by generating strong electrolytic ion water, followed by diluting the electrolytic ion water. Therefore, the productivity of the weak electrolytic ion water is enhanced.

The electrolytic ion water generation apparatus according to the embodiments of the present invention has the following effects.

The electrolytic ion water generation apparatus includes the raw water amount control means. Therefore, electrolytic ion water having the reference pH value and electrolytic ion water having a pH value higher than the reference pH value can be generated with one electrolytic ion water generation apparatus merely by controlling the amount of the raw water to be supplied into the raw water tank with the raw water amount control means.

DESCRIPTION OF THE EMBODIMENTS

Storage Type Electrolytic Ion Water Generation Method According to Embodiment

Figure 1:
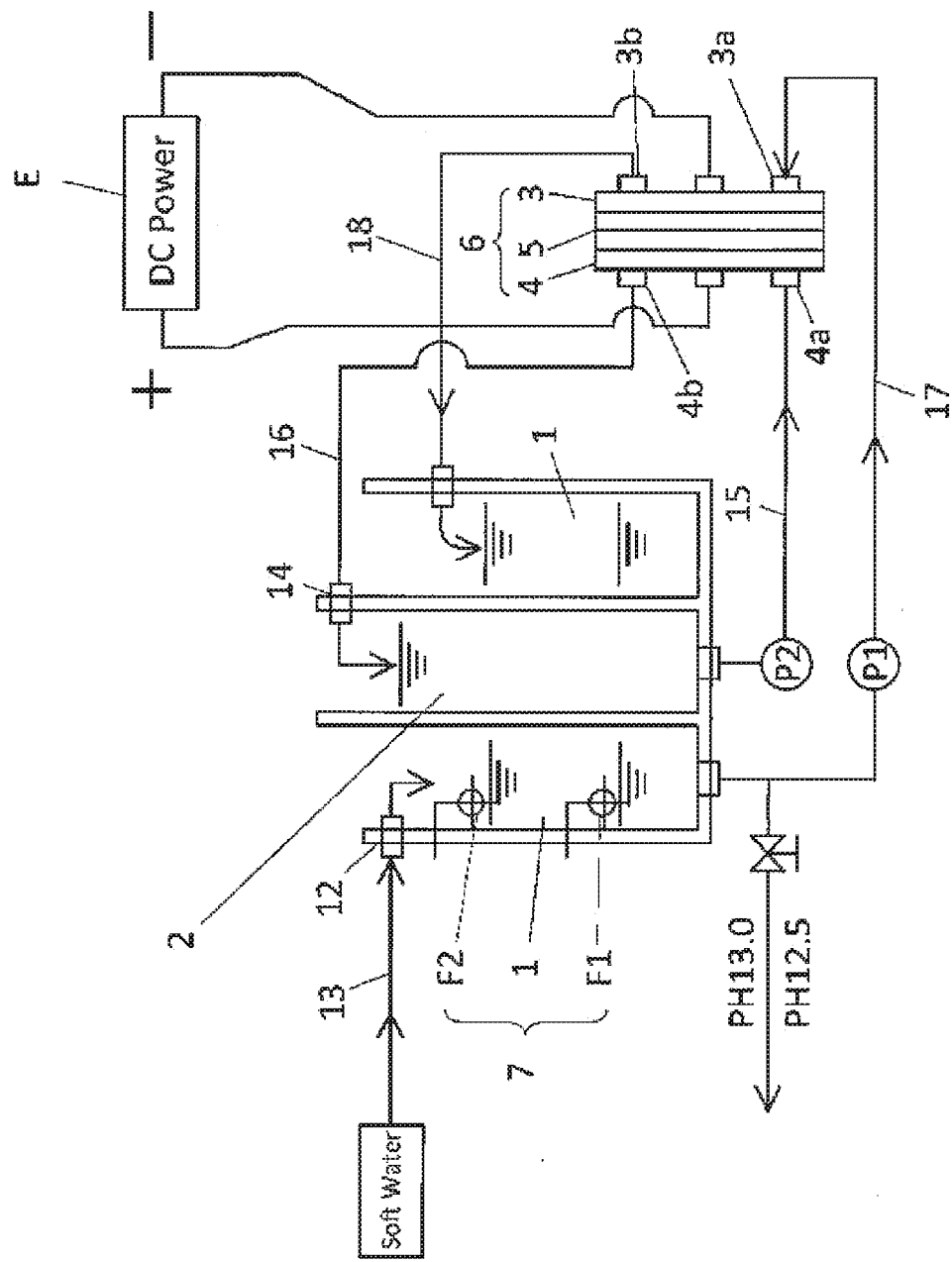
FIG. 1 is a configuration diagram for illustrating an example of an electrolytic ion water generation apparatus of the present invention.

An example of a storage type electrolytic ion water generation method of the present invention is described by exemplifying the case of generating electrolytic ion water through use of an electrolytic ion water generation apparatus of FIG. 1.

The electrolytic ion water generation apparatus of FIG. 1 is of a storage type, and includes an electrolytic ion water generation tank (raw water tank: pH adjusting tank) 1, an electrolytic solution tank 2 arranged concentrically on an inner side of the electrolytic ion water generation tank 1 and configured to store an electrolytic solution, an electrolytic bath 6, a DC power source E, and raw water amount control means 7. The electrolytic bath 6 is partitioned into a cathode chamber 3 and an anode chamber 4 with a cation exchange membrane 5.

In FIG. 1, a raw water circulation path from the raw water tank 1, an inlet port 3a of the cathode chamber 3, and an outlet port 3b of the cathode chamber 3 to the raw water tank 1 is formed so that raw water stored in the raw water tank 1 can be circulated with a raw water circulation pump P1 through the raw water circulation path. Further, an electrolytic solution circulation path from the electrolytic solution tank 2, an inlet port 4a of the anode chamber 4, and an outlet port 4b of the anode chamber 4 to the electrolytic solution tank 2 is formed so that the electrolytic solution stored in the electrolytic solution tank 2 can be circulated with an electrolytic solution circulation pump P2 through the electrolytic solution circulation path.

The raw water amount control means 7 is configured to detect the raw water storage amount in the raw water tank 1, and is capable of detecting the raw water storage amount as an amount (small raw water amount) determined based on the above-mentioned expression with respect to the storage amount (reference raw water amount) required for generating electrolytic ion water having a reference pH value. When the above-mentioned amount is detected, the raw water amount control means 7 causes the supply of the raw water into the raw water tank 1 to be automatically stopped. In FIG. 1, as the raw water amount control means 7, a float switch F2 in an upper stage and a float switch F1 in a lower stage are arranged in the raw water tank 1. The float switch F2 in the upper stage is set to a water level when the electrolytic ion water having the reference pH value is generated, and the float switch F1 in the lower stage is set to a water level when electrolytic ion water having a generation desired pH value is generated. The switches serving as the raw water amount control means 7 may be devices other than the float switches, for example, flowmeters, and those devices may also be arranged in a raw water supply port 12 and the raw water tank 1.

In FIG. 1, when the electrolytic ion water having the reference pH value is generated, the float switch F1 in the lower stage is set to a non-operation state in which the float switch F1 in the lower stage is prevented from being operated even when the raw water stored in the raw water tank 1 has reached the float switch F1 in the lower stage so that only the float switch F2 in the upper stage is operated. When the raw water stored in the raw water tank 1 has reached the float switch F2 in the upper stage (the raw water has reached the amount required for generating the electrolytic ion water having the reference pH value), the supply of the raw water into the raw water tank 1 is automatically stopped. When the electrolytic ion water having the generation desired pH value is generated, the float switch F1 in the lower stage is set to an operation state such that the supply of the raw water into the raw water tank 1 is automatically stopped when the raw water stored in the raw water tank 1 has reached the float switch F1 in the lower stage (the raw water has reached the amount required for generating the electrolytic ion water having the generation desired pH value).

When strong alkaline ion water is generated, the amount of the raw water to be stored into the raw water tank 1 is set to be smaller than that of the raw water used for generating the electrolytic ion water having the reference pH value in the electrolytic ion water generation apparatus. The raw water amount in this case is calculated by the above-mentioned expression. For example, when the raw water amount required for generating electrolytic ion water having a reference pH value of 12.5 (raw water amount stored into the raw water tank 1 and circulated through the cathode chamber 3 of the electrolytic bath 6) is assumed to be 20 L, the raw water amount is set to be 5 L, which is smaller than 20 L, when electrolytic ion water having pH 13.1 is generated. In this case, the electrolytic ion water generation conditions other than the raw water amount, for example, the circulation speed of the raw water, the circulation speed of the electrolytic solution, the power source voltage (current), the electrolytic solution concentration, and the circulation repetition time of the raw water and the electrolytic ion water, are set to the same conditions for generating the electrolytic ion water having the reference pH value in the electrolytic ion water generation apparatus of FIG. 1.

Under the above-mentioned conditions, a voltage is applied to a cathode plate of the cathode chamber 3 and an anode plate of the anode chamber 4 from the DC power source E. Thus, the raw water is circulated with the raw water circulation pump P1 through the raw water tank 1, the inlet port 3a of the cathode chamber 3, the outlet port 3b of the cathode chamber 3, and the raw water tank 1 (one generation cycle), and the electrolytic solution in the electrolytic solution tank 2 is repeatedly circulated with the electrolytic solution circulation pump P2 through the electrolytic solution tank 2, the inlet port 4a of the anode chamber 4, the outlet port 4b of the anode chamber 4, and the electrolytic solution tank 2. In this case, the electrolytic solution in the electrolytic solution tank 2 is subjected to electrolysis, and a cation generated in the anode chamber 4 due to the electrolysis is reduced with the raw water in the cathode chamber 3 through the cation exchange membrane 5, with the result that the raw water is turned into the electrolytic ion water (electrolytic ion water is generated). In this case, the circulation time of the raw water, the circulation time of the electrolytic solution, and the like are set in advance, and the above-mentioned generation is repeated to generate the electrolytic ion water during the set time. The generated electrolytic ion water is stored into the raw water tank 1 to increase (adjust) the pH value.

The above-mentioned numerical value examples are described merely for an illustrative purpose, and for practical use, the raw water amount is calculated by the above-mentioned expression with respect to the raw water amount (reference raw water amount) required for generating the electrolytic ion water having the reference pH. An example thereof is as shown in Table 1.

(Flow Type Electrolytic Ion Water Generation Method According to Embodiment 1)

Figure 2:
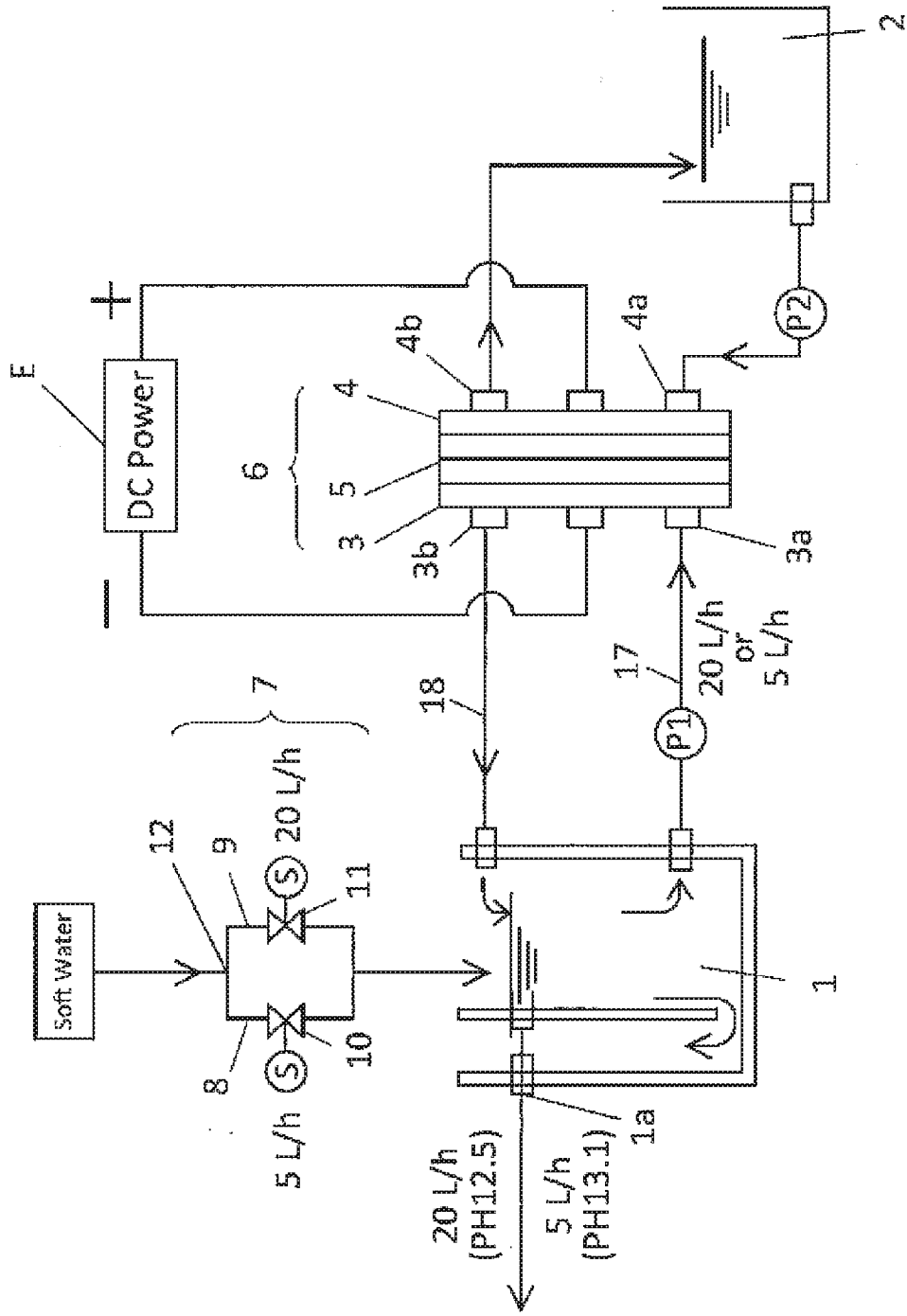
FIG. 2 is a configuration diagram for illustrating another example of the electrolytic ion water generation apparatus of the present invention.

An electrolytic ion water generation apparatus of FIG. 2 is of a flow type and has the same basic configuration as that of the storage type electrolytic ion water generation apparatus of FIG. 1. The flow type electrolytic ion water generation apparatus of FIG. 2 is different from the storage type electrolytic ion water generation apparatus of FIG. 1 in that the raw water tank 1 and the electrolytic solution tank 2 are arranged separately, and two raw water supply paths 8 and 9 are formed as the raw water amount control means 7 for controlling the amount of the raw water to be stored into the raw water tank 1. The supply amounts of the raw water supply paths 8 and 9 per hour are set to different amounts. As an example, the raw water supply path 8 is designed so as to supply 5 L/hour of raw water (pH 13.1), and the raw water supply path 9 is designed so as to supply 20 L/hour of raw water (pH 12.5: reference pH value). The respective raw water supply paths 8 and 9 are automatically opened or closed with electromagnetic valves 10 and 11.

When electrolytic ion water having pH 12.5 is generated through use of the electrolytic ion water generation apparatus of FIG. 2, 20 L/h of raw water is continuously supplied from the raw water supply path 9 into the raw water tank 1. When electrolytic ion water having pH 13.1 is generated, 5 L/h of raw water is continuously supplied from the raw water supply path 8 into the raw water tank 1. In this case, the other conditions for generating the electrolytic ion water are set to the same conditions for generating the electrolytic ion water having the reference pH value in the electrolytic ion water generation apparatus.

When the raw water is supplied from the raw water supply path 8 into the raw water tank 1 under the above-mentioned conditions, the operations of the raw water circulation pump P1 and the electrolytic solution circulation pump P2 are started. Then, the raw water in the raw water tank 1 is circulated with the raw water circulation pump P1 through the raw water tank 1, the inlet port 3a of the cathode chamber 3, the outlet port 3b of the cathode chamber 3, and the raw water tank 1 (one generation cycle), and the electrolytic solution in the electrolytic solution tank 2 is circulated with the electrolytic solution circulation pump P2 through the electrolytic solution tank 2, the inlet port 4a of the anode chamber 4, the outlet port 4b of the anode chamber 4, and the electrolytic solution tank 2 (one generation cycle). Thus, the electrolytic ion water is generated. Also in this case, the circulation time of the raw water, the circulation time of the electrolytic solution, and the like are set in advance. The circulations are performed during the set time to generate electrolytic ion water having pH 13.1, and the generated electrolytic ion water is returned to the raw water tank 1. During this time, when the raw water is continuously supplied from the raw water path 8 and has reached an outlet port 1a in the raw water tank 1 (reached 5 L), the electrolytic ion water is generated continuously (in a flow manner) while the electrolytic ion water in the raw water tank 1 is discharged outside from the outlet port 1a.

When the electrolytic ion water having the reference pH value of 12.5 is generated, the raw water supply amount and the generation amount of the electrolytic ion water are the same (20 L). Therefore, the generated electrolytic ion water is discharged from the outlet port 1a of the raw water tank 1 when the generation cycle has finished one circulation (one generation cycle). However, when the electrolytic ion water having a pH value of 13.1 is generated, the supply amount (5 L) is ¼ of the generation amount (20 L). Therefore, 20 L of the electrolytic ion water having the pH value of 13.1 is generated only after the generation cycle has reached four circulations (four generation cycles), and thereafter, the generated electrolytic ion water is discharged from the outlet port 1a of the raw water tank 1. After that, the raw water is continuously supplied from the raw water supply path 8, and the electrolytic ion water is generated continuously (in a flow manner) while the electrolytic ion water in the raw water tank 1 is discharged outside from the outlet port 1a.

In the electrolytic ion water generation apparatus of FIG. 2, the raw water (soft water in FIG. 2) supplied into the raw water tank 1 may be supplied (refilled) also into the electrolytic solution tank 2 as necessary.

(Flow Type Electrolytic Ion Water Generation Method According to Embodiment 2)

Figure 3:
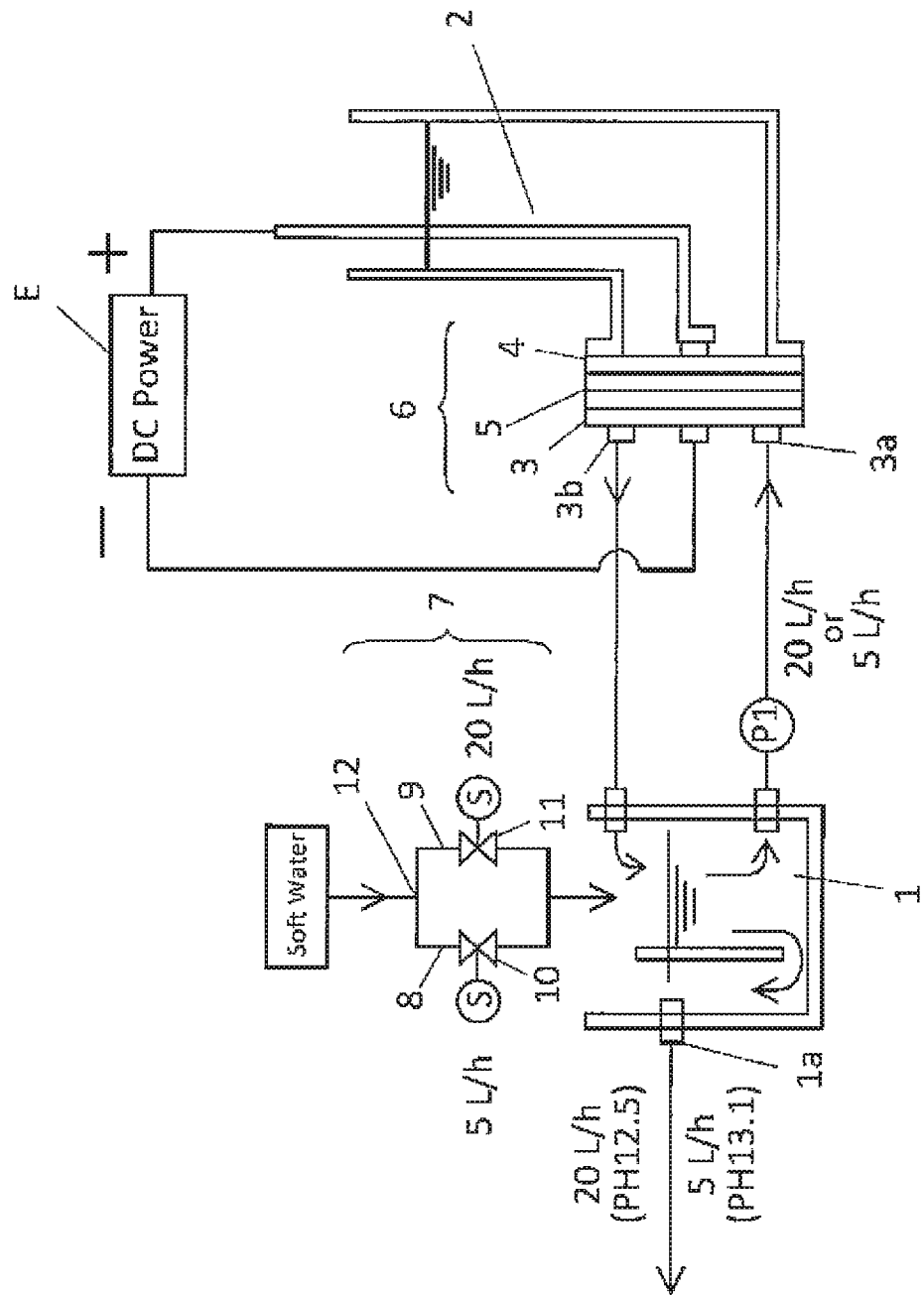
FIG. 3 is a configuration diagram for illustrating still another example of the electrolytic ion water generation apparatus of the present invention.

The principle of an electrolytic ion water generation apparatus of FIG. 3 is the same as that of FIG. 2, and the electrolytic ion water generation apparatus of FIG. 3 is different from that of FIG. 2 in that the electrolytic solution tank 2 is directly connected to the anode chamber 4 of the electrolytic bath 6 so that the electrolytic solution is constantly brought into contact with the anode chamber 4.

In order to generate electrolytic ion water through use of the electrolytic ion water generation apparatus of FIG. 3, electrolytic ion water is generated while raw water in an amount smaller than the reference raw water amount is continuously supplied into the raw water tank 1 in the same manner as in FIG. 2. Also in this case, the other generation conditions are set to the same conditions for generating the electrolytic ion water having the reference pH value except that the raw water supply amount is set to the small amount. Under those conditions, the raw water in the raw water tank 1 is circulated with the raw water circulation pump P1 through the raw water tank 1, the inlet port 3a of the cathode chamber 3, the outlet port 3b of the cathode chamber 3, and the raw water tank 1. Further, the electrolytic solution in the electrolytic solution tank 2 is repeatedly circulated through the anode chamber 4 and the electrolytic solution tank 2. Those circulations are continued for a predetermined time period, with the result that electrolytic ion water is generated from the raw water. Also in this case, in the same manner as in FIG. 2, when the electrolytic ion water having the reference pH value of 12.5 is generated, the raw water supply amount and the generation amount of the electrolytic ion water are the same (20 L). Therefore, the generated electrolytic ion water is discharged from the outlet port 1a when the generation cycle has finished one circulation. However, when the electrolytic ion water having the pH value of 13.1 is generated, the supply amount (5 L) is ¼ of the generation amount (20 L). Therefore, 20 L of the electrolytic ion water having a pH value of 13.1 is generated only after the generation cycle has reached four circulations, and thereafter, the generated electrolytic ion water is discharged from the outlet port 1a. After the electrolytic ion water is discharged from the outlet port 1a, the raw water is continuously supplied from the raw water supply path 8, and the electrolytic ion water is generated continuously (in a flow manner) while the electrolytic ion water in the raw water tank 1 is discharged outside from the outlet port 1a.

Also in the electrolytic ion water generation apparatus of FIG. 3, the raw water (soft water in FIG. 3) supplied into the raw water tank 1 may be supplied (refilled) also into the electrolytic solution tank 2 as necessary.

Experimental Example

In an experiment performed by the inventor of the present invention, when the electrolytic ion water generation apparatus of FIG. 1 was used, the electrolytic ion water (strong electrolytic ion water) having pH 13.1 was able to be generated by setting the amount of the raw water to be stored into the raw water tank 1 to 5 L that was ¼ of the raw water amount (20 L) required for generating the electrolytic ion water having the reference pH value of 12.5. The same applied to the case of using the electrolytic ion water generation apparatus of FIG. 2 and FIG. 3. In any of the experiments, the conditions other than the raw water amount were set to the same conditions for generating the electrolytic ion water having the reference pH value in the electrolytic ion water generation apparatus.

(Storage Type Electrolytic Ion Water Generation Apparatus According to Embodiment: FIG. 1)

An example of the electrolytic ion water generation apparatus of the present invention is described with reference to the drawings. The electrolytic ion water generation apparatus of FIG. 1 is capable of generating the electrolytic ion water having the reference pH value and the electrolytic ion water having a pH value higher than the reference pH value with the single electrolytic ion water generation apparatus by controlling the amount of the raw water to be stored into the raw water tank 1.

The basic configuration of the electrolytic ion water generation apparatus illustrated in FIG. 1 is as described in paragraphs [0029] to [0035], in which the electrolytic ion water generation method is described. As the raw water tank 1, the electrolytic solution tank 2, and the electrolytic bath 6, there may be used a raw water tank, an electrolytic solution tank, and an electrolytic bath that are the same as or different from those of the existing electrolytic ion water generation apparatus.

(Raw Water Tank)

In FIG. 1, the raw water tank 1 and the electrolytic solution tank 2 are arranged in one container so as to be divided into sections. The raw water tank 1 is configured to store the raw water and the electrolytic ion water having a cation reduced by passing through the cathode chamber 3.

The raw water supply port 12 is formed in the raw water tank 1 so that raw water such as pure water, soft water, or tap water is supplied from the raw water supply port 12 into the raw water tank 1.

As the amount of the raw water to be stored into the raw water tank 1, several patterns are set in advance for each pH value of the electrolytic ion water intended to be generated. In this embodiment, as the amount of the raw water to be stored into the raw water tank 1, the following two patterns are set: the raw water amount for generating the electrolytic ion water having pH 12.5 is 20 L, and the raw water amount for generating the electrolytic ion water having pH 13.1 is 5 L. Those numerical values are calculated by the above-mentioned expression. The raw water amounts other than those of the foregoing may also be set depending on the pH value.

The raw water amount control means 7 is arranged in the raw water tank 1. Specifically, the water level detection switches (for example, float switches) F1 and F2 are arranged in two stages: an upper stage and a lower stage. As an example, the float switch F1 in the lower stage is set to (raw water amount for generating the electrolytic ion water having pH 13.1: 5 L), and the float switch F2 in the upper stage is set to (raw water amount for generating the electrolytic ion water having pH 12.5: 20 L).

(Electrolytic Solution Tank)

The electrolytic solution tank 2 illustrated in FIG. 1 is a tubular case having an opened upper surface and is configured to store an electrolyte aqueous solution. The electrolytic solution tank 2 has a cylindrical shape that is more elongated than the raw water tank 1, and is arranged on an inner side of the raw water tank 1. A supply port 14 is formed in the electrolytic solution tank 2 so that the electrolytic solution can be supplied therefrom to be circulated. As the electrolytic solution, a potassium carbonate aqueous solution, a potassium bicarbonate aqueous solution, a sodium bicarbonate alkali salt aqueous solution, or the like can be used.

A drain (not shown) is formed in a lower portion of the electrolytic solution tank 2 so that the electrolytic solution can be discharged outside at a time of maintenance such as cleaning of the inside of the electrolytic solution tank 2 and replacement of the electrolytic solution.

The electrolytic solution tank 2 is connected to the anode chamber 4 of the electrolytic bath 6 through an electrolytic solution passage 15 so that the electrolytic solution stored in the electrolytic solution tank 2 can be supplied into the anode chamber 4 of the electrolytic bath 6 with the electrolytic solution pump P2, and the electrolytic solution from the anode chamber 4 can be returned to the electrolytic solution tank 2 through a return passage 16.

(Electrolytic Bath)

The electrolytic bath 6 of FIG. 1 is partitioned into the cathode chamber 3 and the anode chamber 4 with the cation exchange membrane 5. A cathode plate is arranged in the cathode chamber 3, and an anode plate is arranged in the anode chamber 4. A negative side of the DC power source E is connected to the cathode plate, and a positive side of the DC power source E is connected to the anode plate.

As the cation exchange membrane 5, there may be used an existing or novel exchange membrane, which has the property of passing only a cation therethrough while preventing passage of water. For example, "Selemion" (trademark) manufactured by Asahi Glass Co., Ltd. or an exchange membrane manufactured by Du Pont Japan may be used.

(Example in which Electrolytic Ion Water Having Reference pH Value is Generated Through Use of Storage Type Electrolytic Ion Water Generation Apparatus of FIG. 1)

When the electrolytic ion water having the reference pH value of 12.5 is generated through use of the electrolytic ion water generation apparatus of FIG. 1, the float switch F1 in the lower stage is set to a non-operation state with an operation unit of the electrolytic ion water generation apparatus so that the float switch F1 in the lower stage is prevented from being operated even when the raw water has reached the float switch F1 in the lower stage, and the float switch F2 in the upper stage is set to an operation state.

(1) When a raw water path 13 (reference pH value: 12.5, raw water amount: 20 L) is selected in the above-mentioned state, and thereafter, a power switch of the electrolytic ion water generation apparatus is turned on, the raw water is supplied from the raw water path 13 into the raw water tank 1.

(2) When the water level in the raw water tank 1 has reached the float switch F2 (for generating the electrolytic ion water having pH 12.5, 20 L) in the upper stage, the float switch F2 in the upper stage is operated to start operating the raw water circulation pump P1 and the electrolytic solution circulation pump P2. Then, the raw water in the raw water tank 1 is circulated with the raw water circulation pump P1 through the raw water tank 1, the inlet port 3a of the cathode chamber 3, the outlet port 3b of the cathode chamber 3, and the raw water tank 1, and the electrolytic solution in the electrolytic solution tank 2 is circulated with the electrolytic solution circulation pump P2 through the electrolytic solution tank 2, the inlet port 4a of the anode chamber 4, the outlet port 4b of the anode chamber 4, and the electrolytic solution tank 2, to thereby generate the electrolytic ion water.

(3) During the raw water circulation time and the electrolytic solution circulation time which are set in advance, the circulation is performed, and as a result, the electrolytic ion water having pH 12.5 (reference pH value) is generated and returned to the raw water tank 1.

(Example in which Electrolytic Ion Water Having pH Value of 13.1 is Generated Through Use of Storage Type Electrolytic Ion Water Generation Apparatus of FIG. 1)

A usage example of the electrolytic ion water generation apparatus of FIG. 1 is described. Here, the case of generating the electrolytic ion water having pH 13.1 is exemplified.

The float switch F1 in the lower stage is set to an operation state with the operation unit (control panel) of the electrolytic ion water generation apparatus of FIG. 1 so that the float switch F1 in the lower stage is operated when the raw water has reached the float switch F1 in the lower stage.

(1) When "pH 13.1" is selected with the operation unit of the electrolytic ion water generation apparatus, and the power switch of the electrolytic ion water generation apparatus is turned on, the raw water is supplied into the raw water tank 1, and a DC current is supplied between the cathode plate and the anode plate to be supplied to other electric circuits.

(2) When the raw water is supplied into the raw water tank 1 in an amount (5 L) required for obtaining the electrolytic ion water having "pH 13.1", the float switch F1 in the lower stage is operated, and a flow rate adjusting valve connected to the float switch F1 in the lower stage is automatically closed, with the result that the supply of the raw water is automatically stopped.

(3) The raw water in the raw water tank 1 is supplied into the cathode chamber 3 of the electrolytic bath 6 to pass through the cathode chamber 3. In this case, the electrolytic solution is electrolyzed by being supplied with electric power from the DC power source E to generate a cation. The cation passes through the cation exchange membrane 5 to enter the cathode chamber 3 and is reduced with the raw water, thereby generating the electrolytic ion water. The electrolytic ion water is returned to the raw water tank 1.

(4) The electrolytic solution in the electrolytic solution tank 2 is supplied into the anode camber 4, and the electrolytic solution having passed through the anode chamber 4 is returned to the electrolytic solution tank 2.

(5) The raw water is circulated through the path of the raw water tank 1, the cathode chamber 3, and the raw water tank 1, and the circulation is repeated for a set time period (for example, 60 minutes). During this time, the electrolytic solution is circulated through the path of the electrolytic solution tank 2, the anode chamber 4, and the electrolytic solution tank 2, and the circulation is repeated for the above-mentioned time period. With this repetition, electrolytic ion water having pH 13.1 is generated and stored in the raw water tank 1. The electrolytic ion water is taken from the raw water tank 1.

(Flow Type Electrolytic Ion Water Generation Apparatus According to Embodiment 1: FIG. 2)

The flow type electrolytic ion water generation apparatus of FIG. 2 has the same basic configuration as that of the storage type electrolytic ion water generation apparatus of FIG. 1. The flow type electrolytic ion water generation apparatus of FIG. 2 is different from the storage type electrolytic ion water generation apparatus of FIG. 1 in that the raw water tank 1 and the electrolytic solution tank 2 are arranged separately, and the two raw water supply paths 8 and 9 are formed as the raw water amount control means 7 for controlling the amount of the raw water to be stored into the raw water tank 1. The supply amounts of the raw water supply paths 8 and 9 per hour are set to different amounts. As an example, the raw water supply path 8 is designed so as to supply 5 L/h of raw water (during generation of the electrolytic ion water having pH 13.1), and the raw water supply path 9 is designed so as to supply 20 L/h of raw water (during generation of the electrolytic ion water having the reference pH value of 12.5). The respective raw water supply paths 8 and 9 are electrically opened or closed with the electromagnetic valves 10 and 11.

(Example in which Electrolytic Ion Water Having Reference pH Value is Generated Through Use of Flow Type Electrolytic Ion Water Generation Apparatus of FIG. 2)

The electrolytic ion water having the reference pH value of 12.5 is generated through use of the flow type electrolytic ion water generation apparatus of FIG. 2 as follows.

(1) The power switch is turned on to operate the electrolytic ion water generation apparatus, to thereby apply DC power between the cathode plate and the anode plate.

(2) The raw water supply path 9 having "pH 12.5" in the electrolytic ion water generation apparatus of FIG. 2 is selected, and 20 L/h of the raw water is continuously supplied from the raw water supply path 9.

(3) When the raw water is stored into the raw water tank 1, the operations of the raw water circulation pump P1 and the electrolytic solution circulation pump P2 are started. Then, the raw water is supplied into the cathode chamber 3 of the electrolytic bath 6 through a raw water path 17 and returned (circulated) to the raw water tank 1. The electrolytic solution in the electrolytic solution tank 2 is supplied into the anode chamber 4 of the electrolytic bath 6 and returned (circulated) to the electrolytic solution tank 2. After that, the raw water is continuously supplied into the raw water tank 1. During this time, a potassium ion (cation) generated in the anode chamber 4 by electrolysis enters the cathode chamber 3 through the cation exchange membrane 5 and is reduced with the raw water in the cathode chamber 3 to generate electrolytic ion water.

(4) The generated electrolytic ion water having the reference pH value of 12.5 is stored into the raw water tank 1 through a feedback flow passage 18. When the generation is repeated for the set time period, the electrolytic ion water having the reference pH value of 12.5 is stored into the raw water tank 1.

(5) When the electrolytic ion water having the reference pH value of 12.5 is generated, the raw water supply amount and the generation amount of the electrolytic ion water are the same (20 L). Hence, the raw water is continuously supplied from the raw water supply path 9 until the amount reaches 20 L, and 20 L of electrolytic ion water is thus generated.

(6) When the electrolytic ion water in the raw water tank 1 reaches 20 L, the outlet port 1a of the raw water tank 1 is opened, and the electrolytic ion water having pH 12.5 is discharged. After that, while the electrolytic ion water is discharged, and the raw water is supplied (in a flow manner) by the discharged amount from the raw water supply path 9, the electrolytic ion water is continuously generated and discharged from the raw water tank 1.

(Example in which Electrolytic Ion Water Having pH Value of 13.1 is Generated Through Use of Flow Type Electrolytic Ion Water Generation Apparatus of FIG. 2)

The electrolytic ion water having pH 13.1 is generated through use of the flow type electrolytic ion water generation apparatus of FIG. 2 as follows.

(1) The raw water supply path 8 having "pH 13.1" in the flow type electrolytic ion water generation apparatus of FIG. 2 is selected, and 5 L/h of the raw water is continuously supplied from the raw water supply path 8.

(2) When the raw water is supplied into the raw water tank 1, the operations of the raw water circulation pump P1 and the electrolytic solution circulation pump P2 are started, and electrolytic ion water is generated in the same manner as in the above-mentioned usage example.

(3) The generated electrolytic ion water is discharged to the raw water tank 1. However, the outlet port 1a of the raw water tank 1 is opened only after the electrolytic ion water reaches 20 L, and then the electrolytic ion water in the raw water tank 1 is discharged. The raw water supply amount (5 L) in this case is ¼ of the generation amount (20 L), and hence 20 L of the electrolytic ion water having the pH value of 13.1 is generated only after the generation cycle has reached four circulations, and thereafter, the generated electrolytic ion water is discharged from the outlet port 1a of the raw water tank 1. After that, the raw water is continuously supplied from the raw water supply path 8, and electrolytic ion water is continuously generated while the electrolytic ion water in the raw water tank 1 is discharged (flows) outside from the outlet port 1a.

The other generation conditions are set to the same as those for generating the electrolytic ion water having the reference pH value except that the raw water amount is set to 5 L in the above-mentioned usage example.

(Flow Type Electrolytic Ion Water Generation Apparatus According to Embodiment 2: FIG. 3)

The flow type electrolytic ion water generation apparatus of FIG. 3 is substantially the same as the flow type electrolytic ion water generation apparatus of FIG. 2, and the flow type electrolytic ion water generation apparatus of FIG. 3 is different from that of FIG. 2 in that the electrolytic tank 2 is connected to the electrolytic bath 6.

(Method of Using Flow Type Electrolytic Ion Water Generation Apparatus of FIG. 3)

The generation of electrolytic ion water through use of the flow type electrolytic ion water generation apparatus of FIG. 3 is the same as the generation of electrolytic ion water through use of the electrolytic ion water generation apparatus of FIG. 2.

(Filtering Device)

In any of the electrolytic ion water generation apparatus of FIG. 1 to FIG. 3, it is desired that a filtering device be arranged on an upstream side of the raw water supply paths 8 and 9 connected to the raw water tank 1. Examples of the filtering device include a 5 μm-mesh filter (hereinafter referred to as "5μ filter"), activated carbon filter (hereinafter referred to as "AC filter"), and a reverse osmosis membrane (RO membrane) filter (hereinafter referred to as "RO filter"). Those filters can remove calcium, magnesium, and the like contained in tap water.

A pure water tank may be connected in the middle of the raw water supply paths 8 and 9 so that pure water in the pure water tank is supplied into the raw water tank 1.

OTHER EMBODIMENTS

The above-mentioned embodiments are merely examples of the present invention, and other embodiments may also be used. The pH value of the strong electrolytic ion water is not limited to 13.0 and 13.1. The pH value may be equal to or more than those values or may be equal to or less than those values. The reference pH value may also be higher or lower than 12.5. The above-mentioned embodiments exemplify the case of generating strong electrolytic ion water. However, weak electrolytic ion water may also be generated by setting the amount of the raw water, which is to be stored or supplied, to be larger than that during generation of the electrolytic ion water having the reference pH value. The raw water amount in this case can be calculated by the above-mentioned expression.

The electrolytic ion water generation method and the electrolytic ion water generation apparatus of the present invention can generate electrolytic ion water to be used widely for cleaning components after mechanical processing, cleaning agricultural chemicals of agricultural crops, cleaning the inside of a room, cleaning a body, and the like. Electrolytic ion water having a low reference pH value (weak alkaline ion water) can be generated by setting the amount of the raw water, which is to be stored into the raw water tank 1, to be larger than that for generating the electrolytic ion water having the reference pH value and setting the other generation conditions to the same conditions as those for generating the electrolytic ion water having the reference pH value (including the case where the other generation conditions are substantially the same as those for generating the electrolytic ion water having the reference pH value).

REFERENCE SIGNS LIST 1 electrolytic ion water generation tank (raw water tank)
1a outlet port (of raw water tank)
2 electrolytic solution tank
3 cathode chamber
3a inlet port (of cathode chamber)
3b outlet port (of cathode chamber)
4 anode chamber
4a inlet port (of anode chamber)
4b outlet port (of anode chamber)
5 cation exchange membrane
6 electrolytic bath
7 raw water amount control means
8/9 raw water supply path
10/11 electromagnetic valve
12 raw water supply port
13 raw water path
14 supply port
15 electrolytic solution passage
16 return passage
17 raw water path
18 feedback flow passage P1 raw water circulation pump
P2 electrolytic solution circulation pump
E DC power source
F1 float switch in the lower stage
F2 float switch in the upper stage

The invention claimed is:

1. A storage type electrolytic ion water generation apparatus, which is capable of circulating raw water stored in a raw water tank by sending the raw water to a cathode chamber partitioned by a cation exchange membrane of an electrolytic bath and returning the raw water from the cathode chamber to the raw water tank, circulating an electrolytic solution stored in an electrolytic solution tank of the storage type electrolytic ion water generation apparatus to an anode chamber of the electrolytic bath, applying a voltage to a cathode plate of the cathode chamber of the electrolytic bath and to an anode plate of the anode chamber of the electrolytic bath, to thereby subject the electrolytic solution to electrolysis, reducing a cation generated by the electrolysis with the raw water circulated in the cathode chamber, and repeating the circulation of the raw water and the circulation of the electrolytic solution until the raw water in the raw water tank reaches a predetermined pH value, to thereby generate the electrolytic ion water having a generation desired pH value from the raw water stored in the raw water tank, the storage type electrolytic ion water generation apparatus comprising raw water amount control means, and being capable of controlling a raw water amount to be stored into the raw water tank with the raw water amount control means to generate electrolytic ion water having a reference pH value and strong electrolytic ion water having a pH value higher than the reference pH value with the single storage type electrolytic ion water generation apparatus without changing generation conditions other than the raw water amount, wherein, when the strong electrolytic ion water is generated, the raw water amount control means is capable of setting a raw water amount to be stored into the raw water tank to be smaller than a raw water amount for generating the electrolytic ion water having the reference pH value, and the raw water amount is determined based on the following expressions 1, 2, and 3 with respect to a raw water amount required for generating the electrolytic ion water having the reference pH value, wherein [OH⁻] (mol/L) for strong electrolytic ion water having a pH value that at least is the generation desired pH value and is higher than the reference pH value is determined based on the expression 1:

$$pH = 14 + \log[OH^-] \quad \text{(expression 1);}$$

determining, based on an expression 2, an alkali concentration ratio at the determined [OH⁻] (mol/L) with an alkali concentration ratio at the reference pH value being 1:

alkali concentration ratio=[OH⁻] at generation desired pH value/[OH⁻] at reference pH value (expression 2);

determining, based on an expression 3, a raw water storage amount to be stored into the raw water tank, which is required for generating the strong electrolytic ion water having the pH value that is higher than the reference pH value, with the alkali concentration ratio at the reference pH value being 1 and a raw water amount to be stored into the raw water tank at the reference pH value being XL:

raw water storage amount=XL/alkali concentration ratio during generation of electrolytic ion water having generation desired pH value (expression 3); and wherein the raw water in the raw water storage amount determined based on the expression 3 is stored into the raw water tank as the raw water in a raw water storage amount required for generating the strong electrolytic ion water having the generation desired pH value, wherein the raw water amount control means comprises at least two detectors capable of detecting the raw water amount in the raw water tank, wherein the at least two detectors are arranged separately in an upper stage of the raw water tank and a lower stage of the raw water tank, wherein the detector in the upper stage is arranged at a position allowing the detector in the upper stage to detect a water level of a reference raw water amount required for generating the electrolytic ion water having the reference pH value, wherein the detector in the lower stage is arranged at a position allowing the detector in the lower stage to detect the raw water amount that is a storage amount required for generating the strong electrolytic ion water having the generation desired pH value and is determined based on the expressions 1, 2, and 3 with respect to the reference raw water amount, wherein, when the electrolytic ion water having the reference pH value is generated, the supply of the raw water is prevented from being stopped even when the raw water stored in the raw water tank has reached the detector in the lower stage, and the supply of the raw water into the raw water tank is automatically stopped when the raw water has reached the detector in the upper stage and it is detected that the raw water has reached an amount required for generating the electrolytic ion water having the reference pH value, and wherein, when the strong electrolytic ion water having the generation desired pH value is generated, the supply of the raw water into the raw water tank is automatically stopped when the raw water stored in the raw water tank has reached the detector in the lower stage and it is detected that the raw water has reached an amount required for generating the strong electrolytic ion water having the generation desired pH value.

2. A flow type electrolytic ion water generation apparatus, which is capable of circulating raw water supplied into a raw water tank by sending the raw water to a cathode chamber partitioned by a cation exchange membrane of an electrolytic bath and returning the raw water from the cathode chamber to the raw water tank, circulating an electrolytic solution stored in an electrolytic solution tank of the flow type electrolytic ion water generation apparatus to an anode chamber partitioned by a cation exchange membrane, applying a voltage to a cathode plate of the cathode chamber of the electrolytic bath and to an anode plate of the anode chamber of the electrolytic bath, to thereby subject the electrolytic solution to electrolysis, reducing a cation generated by the electrolysis with the raw water circulated in the cathode chamber, to thereby generate electrolytic ion water from the raw water, and generating electrolytic ion water having a generation desired pH value while discharging the electrolytic ion water having reached a predetermined pH value in the raw water tank from the raw water tank by a raw water supply amount to the raw water tank, the flow type electrolytic ion water generation apparatus comprising raw water amount control means, and being capable of controlling a raw water amount to be stored into the raw water tank with the raw water amount control means to generate electrolytic ion water having a reference pH value and strong electrolytic ion water having a pH value higher than the reference pH value with the single flow type electrolytic ion water generation apparatus without changing generation conditions other than the raw water amount, wherein, when the strong electrolytic ion water is generated, the raw water amount control means is capable of setting a raw water amount to be supplied into the raw water tank to be smaller than a raw water amount for generating the electrolytic ion water having the reference pH value, and the raw water amount is determined based on the following expressions 1, 2, and 3 with respect to a raw water amount required for generating the electrolytic ion water having the reference pH value, wherein [OH$^-$] (mol/L) for strong electrolytic ion water having a pH value that at least is the generation desired pH value and is higher than the reference pH value is determined based on the expression 1:

$$pH=14+\log[OH^-] \quad \text{(expression 1);}$$

determining, based on an expression 2, an alkali concentration ratio at the determined [OH$^-$] (mol/L) with an alkali concentration ratio at the reference pH value being 1:

$$\text{alkali concentration ratio}=[OH^-] \text{ at generation desired pH value}/[OH^-] \text{ at reference pH value} \quad \text{(expression 2);}$$

determining, based on an expression 3, a raw water storage amount to be stored into the raw water tank, which is required for generating the strong electrolytic ion water having the pH value that is higher than the reference pH value, with the alkali concentration ratio at the reference pH value being 1 and a raw water amount to be stored into the raw water tank at the reference pH value being XL:

$$\text{raw water storage amount}=XL/\text{alkali concentration ratio during generation of electrolytic ion water having generation desired pH value} \quad \text{(expression 3); and}$$

wherein the flow type electrolytic ion water generation apparatus is capable of generating electrolytic ion water, while supplying the raw water in the raw water supply amount determined based on the expression 3 into the raw water tank as the raw water in a raw water supply amount required for generating the strong electrolytic ion water and discharging the generated electrolytic ion water from the raw water tank, wherein the raw water amount control means comprises at least two raw water supply paths, wherein at least one of the at least two raw water supply paths has a raw water supply amount per unit time enabling supply of the raw water in an amount required for generating the electrolytic ion water having the reference pH value, wherein another of the at least two raw water supply paths has a raw water supply amount per unit time enabling supply of the raw water in the amount determined based on the expressions 1, 2, and 3, wherein, when the electrolytic ion water having the reference pH value is generated, one of the at least two raw water supply paths for the reference pH value is selected, and the raw water is continuously supplied from the one of the at least two raw water supply paths to the raw water tank, thereby being capable of generating the electrolytic ion water having the reference pH value, and wherein, when the strong electrolytic ion water having a pH value higher than the reference pH value is generated, the one of the at least two raw water supply paths is switched to another of the at least two raw water supply paths for the strong electrolytic ion water, and the raw water is continuously supplied from the another of the at least two raw water supply paths to the raw water tank, thereby being capable of continuously generating the strong electrolytic ion water.

* * * * *